United States Patent [19]

Nagasaki et al.

[11] 4,144,480
[45] Mar. 13, 1979

[54] HIGH VOLTAGE GENERATING APPARATUS

[75] Inventors: Tadashi Nagasaki; Mitsuharu Akatsu; Mitsuo Otsu, all of Yokohama, Japan

[73] Assignee: Hitachi, Ltd., Japan

[21] Appl. No.: 756,864

[22] Filed: Jan. 4, 1977

[30] Foreign Application Priority Data

Jan. 9, 1976 [JP] Japan ................................... 51-1549

[51] Int. Cl.² .............................................. H01J 29/70
[52] U.S. Cl. .................................... 315/411; 315/382; 315/31 TV
[58] Field of Search ............... 315/411, 387, 389, 382, 315/31 R, 31 TV

[56] References Cited

U.S. PATENT DOCUMENTS

| 3,846,666 | 11/1974 | Suzuki et al. | 315/411 |
| 3,866,086 | 2/1975 | Miyoshi et al. | 315/411 |
| 3,936,719 | 2/1976 | Miyoshi et al. | 315/411 |

Primary Examiner—Maynard R. Wilbur
Assistant Examiner—T. M. Blum
Attorney, Agent, or Firm—Craig & Antonelli

[57] ABSTRACT

A high voltage generating apparatus suitable for a television receiver. A flyback transformer has a secondary winding divided into a plurality of parts by at least a diode and a primary winding connected to a variable voltage divider circuit for varying the primary-side flyback pulse voltage. The variable voltage divider circuit is connected to an end of a focus capacitor with the other end thereof connected to the cathode of the diode, so that a variable pulse voltage is applied to the focus capacitor to regulate the focus voltage.

7 Claims, 12 Drawing Figures

F I G. 5
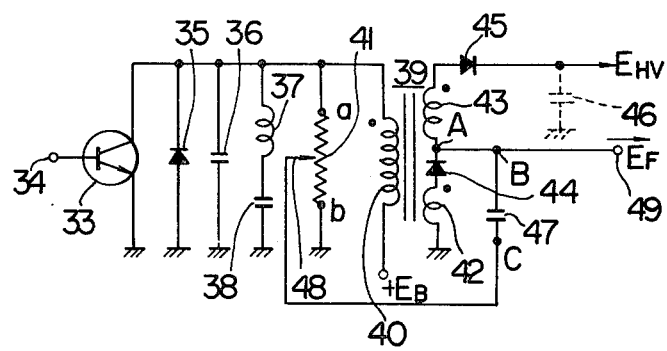
F I G. 6
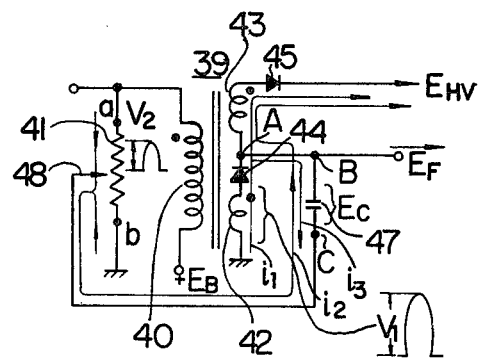

HIGH VOLTAGE GENERATING APPARATUS

BACKGROUND OF THE INVENTION

1. Field of the Invention

This invention relates to a high voltage generating apparatus for a television receiver, or more in particular to a high voltage generating apparatus with an improved focus voltage supply circuit.

2. Description of the Prior Art

In a picture tube which is the so-called bipotential focus lens type used for the television receiver or like, a D.C. focus voltage in proportion to the D.C. anode voltage is required. The optimum value of focus voltage for the color picture tube of the conventional television receivers is 18% to 21% of the anode voltage depending on the picture tube involved. Therefore, the high voltage generating apparatus for such a receiver must be provided with a focus voltage generator circuit capable of generating a voltage in a certain variable range, in addition to an anode voltage generation circuit.

Various focus regulator circuits are well known. With expensive and bulky high voltage resistors or regulating transformer, they are high in cost and require a large space, and because of their high working voltages, they are disadvantageous to reliability and operability.

A fundamental circuit configuration of a conventional well known high voltage generating apparatus is shown in FIG. 1. Reference numeral 1 designates a horizontal output tube, numeral 2 a damper tube, numeral 3 a flyback transformer, numeral 4 a high voltage rectifier tube for anode D.C. voltage, numeral 5 a focus diode, numeral 6 a focus capacitor, numeral 7 a focus-regulating transformer, numeral 8 a movable core of the focus regulating transformer 7, numeral 9 a focus breeder resistor, and numeral 10 an anode-to-earth capacitance of the picture tube. A sectional view of FIG. 2 shows the construction of the focus regulating transformer 7. In this drawing, numeral 11 designates a coil bobbin, numeral 12 coils and numeral 8 a regulating movable core.

The flyback transformer 3 is an auto-transformer having a tap A at a point where the flyback pulse voltage during the blanking period is substantially equal to the required focus D.C. voltage. The flyback pulse is rectified by the focusing diode 5 and the focusing capacitor 6 thereby to produce a focus D.C. voltage $E_F$. The other end D of the focusing capacitor 6 is impressed with a variable flyback pulse voltage obtained from the focus regulating transformer 7, thus regulating the focus voltage $E_F$. The focus regulating transformer 7, as shown in FIG. 2, comprises three coils $L_1$, $L_2$ and $L_3$. The coils $L_1$ and $L_3$ are connected in opposite phase, and across them is impressed a flyback pulse generated between the tap B and the starting point C of the winding of the flyback transformer 3. Further, the coil $L_2$, which is provided in the same magnetic circuit, has an end connected to a junction point of the coils $L_1$ and $L_3$, and the other end D connected to the low-voltage side of the focusing capacitor 6. When the regulating core 8 is moved in the direction shown by the arrow, the coupling between the coils $L_1$, $L_2$ and $L_3$ changes and therefore the flyback pulse voltage generated in the coil $L_2$ also changes, thus making it possible to regulate the magnitude of the flyback pulse voltage at point D. By the way, the focus power supply has a high breakdown voltage and is grounded through the focus breeder resistor 9. The purpose of this is to improve the tracking characteristics and response speed of the focus voltage $E_F$ against anode voltage $E_{HV}$. The internal impedance of the focus electrode is almost infinitely large so that, in the absence of the focus breeder resistor 9, even if the anode voltage $E_{HV}$ is reduced, charges stored in the focus capacitor 6 have no discharge path, thus maintaining the focus voltage $E_F$ at high level.

The focus regulating transformer 7 which are coils used in the above-mentioned conventional method handles a comparatively high pulse voltage for its capacity of approximately 1.5 KV. To maintain high reliability, it is both bulky and expensive. Further, the voltage regulating system has such a construction as shown in FIG. 2 that the core is moved extensively by rotation in combination with a bobbin having a threaded groove, resulting in the disadvantage of the complicated regulating operation. Furthermore, a large-sized high-cost resistor with a high breakdown voltage is required as the focus breeder resistor 9, thus leading to the shortcomings in respect of cost, reliability, safety and mounting space.

FIG. 3 shows a focus regulator circuit often used for a transistorized high voltage generating apparatus. In this drawing, numeral 13 designates a horizontal output transistor, numeral 14 a damper diode, numeral 15 a resonate capacitor, numeral 16 a deflection yoke, numeral 17 an S-shaped correction capacitor, numeral 18 a flyback transformer, numeral 19 a primary winding, 20 a high voltage winding, numeral 21 a high voltage diode, 22 and 24 high voltage resistors, and numeral 23 a variable resistor. As will be seen from FIG. 3, the focus D.C. voltage $E_F$ in the form of the desired variable voltage proportional to the anode D.C. voltage $E_{HV}$ is obtained by dividing the anode D.C. voltage $E_{HV}$ directly by the high voltage resistors 22 and 24 and the variable resistor 23.

This circuit, though capable of producing a required voltage with comparative ease, has many disadvantages. In a color picture tube which requires a high anode voltage $E_{HV}$ of 20 to 25 KV, for instance, the voltage-dividing resistors 22, 23 and 24 and their mounting structure must be sufficiently insulated to stand the high voltage. This circuit has the disadvantages that it is in need of a high insulating ability, high cost a bulkiness on the one hand and a comparatively high power consumption by the resistors on the other.

Another conventional circuit partially improved over the circuit of FIG. 3 is shown in FIG. 4. In the drawing under consideration, the secondary winding of the flyback transformer 18 is divided into two parts 25 and 26. The first part 25 of the secondary winding is connected in series with the diode 27 therefor and the focus capacitor 29 with one end thereof grounded. A DC voltage generated by the focus capacitor 29 is divided by the high voltage resistors 30 and 32 and the variable resistor 31 thereby to produce a variable focus voltage. Also, an end of the first part 26 of the secondary winding is connected to the cathode of the diode 27 for the first part of the secondary winding, and thereby the focus D.C. voltage is used as part of the anode D.C. voltage. A separate diode 28 is used for rectification of the voltage across the first part of the secondary winding. This method reduces the voltage applied to the resistors by approximately one-fourth of the voltage in the circuit of FIG. 3, but still has the same shortcomings as the circuit of FIG. 3.

SUMMARY OF THE INVENTION

An object of the present invention is to provide an improved high voltage generating apparatus used for the television receiver.

Another object of the invention is to provide a high voltage generating apparatus with a simple circuit configuration for a superior high voltage regulation.

A further object of the invention is to provide a high voltage generating apparatus with a simple circuit configuration, in which the focus voltage accurately follows the variations of high voltages.

According to the present invention, there is provided a high voltage generating apparatus comprising a flyback transformer including the secondary winding divided into first and second parts, a second rectifying diode inserted between the second part of the secondary winding and the anode of a picture tube, a first rectifying diode inserted between the first and second parts of the secondary winding in the same direction as the second rectifying diode, a focus capacitor connected to the cathode of the first rectifying diode which in turn is connected to the focus electrode of the picture tube, and a variable voltage-dividing circuit connected to the other end of the focus capacitor for generating a variable flyback pulse voltage, so that a variable focus D.C. voltage is generated at the junction point of the first rectifying diode and the focus capacitor.

BRIEF DESCRIPTION OF THE DRAWINGS

FIG. 5 a diagram showing the circuit configuration of a high voltage generating apparatus according to the present invention.

FIG. 6 is a diagram for illustrating the operation of the apparatus of FIG. 5.

DETAILED DESCRIPTION OF THE PREFERRED EMBODIMENTS

Figure 1:
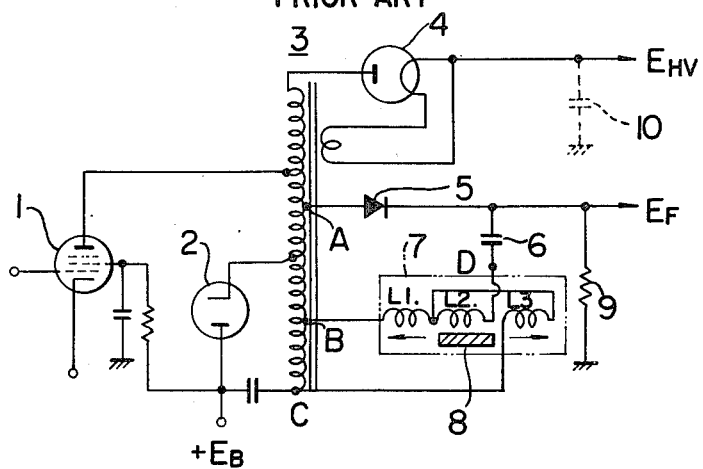
FIGS. 1, 3 and 4 are diagrams showing circuit configurations of conventional high voltage generating apparatus.
Figure 2:
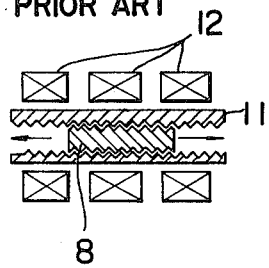
FIG. 2 is a sectional view showing the construction of the focus regulating transformer shown in FIG. 1.
Figure 3:
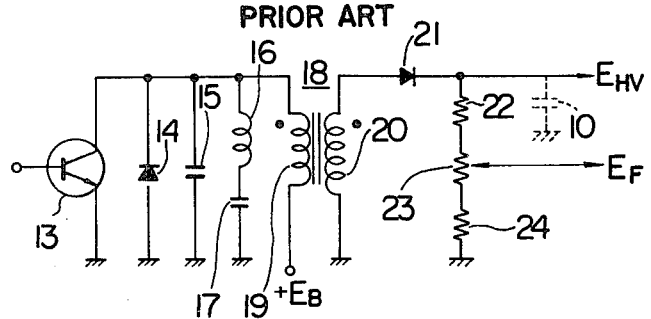
Figure 4:
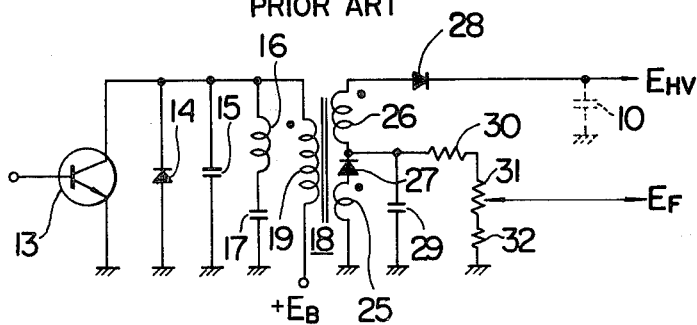

An embodiment of the present invention will be described below with reference to FIGS. 5 and 6.

The circuit configuration of a high voltage generating apparatus according to an embodiment of the invention is shown in FIG. 5. In this drawing, numeral 33 designates a horizontal output transistor switchable in response to a horizontal drive signal applied to the input terminal 34 thereof, numeral 35 a damper diode, numeral 36 a resonate capacitor, numeral 37 a deflection coil, and numeral 38 a capacitor for S-shaped correction and D.C. blocking, all of which are connected in parallel to the primary winding 40 of the flyback transformer 39. The primary winding 40 of the flyback transformer 39 is also connected with a variable resistor 41 capable of varying the flyback pulse voltage between the maximum and the minimum value.

The secondary winding of the flyback transformer 39 is divided into the first part 42 and the second part 43 which may be called a focus winding part and a high voltage winding part, respectively. The secondary side of the flyback transformer 39 is so constructed that a plurality of diodes each with a cathode and an anode are connected with the first part 42 and the second part 43 of the secondary winding. Specifically, a first diode 44 is inserted between the first part 42 and the second part 43 of the secondary winding in such a manner that the anode and the cathode thereof are connected to the finishing end of the first part 42 and the starting end of the second part 43. Further, a second diode 45 is inserted between the second part 43 of the secondary winding and the anode of the picture tube in the same direction as the first diode 44.

The pulse voltage generated across the first part 42 of the secondary winding is rectified by the first diode 44, superimposed on the pulse voltage across the second part 43 of the secondary winding, and the resulting pulse voltage is rectified and smoothed by the second diode 45 and the anode-ground capacity of the picture tube, with the result that the required voltage $E_{HV}$ is applied to the anode of the picture tube.

If the first part 42 and the second part 43 of the secondary winding are called the focus winding and the high voltage winding, respectively as already mentioned, the first diode 44 and the second diode 45 may be called a focus voltage diode and a high voltage rectifying diode, respectively.

Further, the cathode of the first diode 44 is connected to the focus electrode of the picture tube, and a junction point therebetween is connected with a focus capacitor 47, thereby making up a rectifier circuit. The other end of the focus capacitor 47 is connected to a slider 48 of the variable resistor 40 inserted in the primary side of the flyback transformer 39.

The method of regulating the focus voltage in the circuit of FIG. 5 with the above-mentioned construction will be explained with reference to FIG. 6.

The focus capacitor 47 has an end B connected to the cathode of the diode 44, while the other end C thereof is connected to a voltage-dividing circuit including a variable resistor 41. The terminal B of the focus capacitor 47 is impressed with the flyback pulse voltage produced by the first part 42 of the secondary winding, and the other terminal C thereof with the flyback pulse voltage of the primary side.

Now, assume that the current-voltage relation as shown in FIG. 6 is present. Reference character $i_1$ is the current flowing through the first diode 44, reference character $i_2$ the current flowing through the focus capacitor 47 in the cut-off state of the first diode 44, and reference character $i_3$ the current flowing through the focus capacitor 47 from the first diode 44. Reference character $E_{HT}$ designates the anode voltage of the picture tube, reference character $V_1$ is the positive portion of the pulse voltage generated across the first part 42 of the secondary winding, reference character $V_2$ the positive portion of the primary-side flyback pulse applied to the variable resistor 41 making up a voltage-dividing circuit, reference character $E_C$ a voltage charged to the focus capacitor, and reference character $E_F$ the focus voltage produced at the slider 48.

Under the normal operating conditions of the television receiver, the shown pulse voltage $V_1$ is produced across the first part 42 of the secondary winding and the pulse voltage $V_2$ is generated between points a and b of the variable resistor 41. The magnitude of the pulse voltage $V_2$ is variable as desired from 1000 V at maximum to 0 V at minimum by sliding the slider 48 of the variable resistor 41.

Assume that the slider 48 of the variable resistor 41 is positioned for the minimum voltage. No voltage is applied from the variable resistor 41 to the focus capacitor 47, and therefore the pulse voltage $V_1$ generated across the first part 42 of the secondary winding is rectified and smoothed by the first diode 44 and the focus capacitor 47 and produced at point B, so that it is applied from the terminal 48 to the focus electrode of the picture tube as a focus voltage $E_F$. Under this condition, the voltage $E_C$ charged to the focus capacitor 47 takes the form of pulse voltage $V_1$.

Because of the performance variations caused in the course of picture tube manufacture, however, the voltage applied to the focus electrode does not always represent 20% of the high voltage $E_{HV}$ but is somewhat displaced from the particular fraction. As a result, the range of regulation from 18% to 22% of the high voltage $E_{HV}$ is always required. From this, it will be seen that, as mentioned above, the pulse voltage $V_1$ generated across the first part 42 of the secondary winding cannot be applied directly.

To overcome this problem, the pulse voltage $V_2$ the magnitude of which is changed by operating the slider 48 of the variable resistor 41 is applied to a terminal C of the focus capacitor 47, thereby changing the pulse voltage $V_1$ generated across the first part 42 of the secondary winding. In other words, since the pulse voltage $V_2'$ generated between the slider 48 of the variable resistor and point b is applied to the focus capacitor 47, the pulse voltage $V_1$ across the first part 42 of the secondary winding is reduced by $V_2'$ and then produced at point B. The focus adjustment according to the invention is effected by applying to the terminal C of the focus capacitor 47 a variable flyback pulse voltage obtained by application of the primary-side flyback pulse voltage of the flyback transformer 39 through the variable resistor 41.

This circuit configuration requires no voltage-dividing resistor with a high breakdown voltage and is more reliable than the conventional circuits in which a focus voltage is obtained by dividing the high voltage by means of a resistor with a high breakdown voltage connected to the secondary side of the flyback transformer.

In addition to these advantages, another advantage of the focus tracking characteristics, especially, a high response speed will be explained below in association with the increase or decrease in the anode voltage $E_{HV}$ of the picture tube with the increase or decrease in the brightness of the picture tube screen. The current-voltage relation in this case is shown in FIG. 6.

The cathode of the first diode, namely, an end of the focus capacitor 47 is connected with the second part 43 of the secondary winding. For this construction, when brightness of the picture tube screen increases and consequently an anode voltage $E_{HV}$ is reduced the load of the flyback transformer 39 is increased, thereby reducing the flyback pulse voltage $V_1$ generated across the first part 42 and the second part 43 of the secondary winding. In other words, the voltage at point A, which takes a voltage value generated across the first part 42 of the secondary winding, is reduced below the voltage $E_C$ charged to the focus capacitor 47, whereupon the first diode 44 is temporarily cut off. The current $i_2$ flows through the focus capacitor 47 from the variable resistor 41 in the direction of arrow in such a manner as to reduce the focus voltage $E_F$. The current $i_2$ continues to flow until the voltage charged to the focus capacitor 47 coincides with the voltage across the first part 42 of the secondary winding, i.e., the voltage at point A. When the voltages at points A and B coincide with each other, the first diode 44 is turned on and the current $i_2$ is cut off, so that the focus voltage $E_F$ proportional to the high voltage $E_{HV}$ is applied from the terminal 49 to the focus electrode for an instant.

Next, explanation will be made of the case in which reduced brightness of the picture tube screen causes an increased anode voltage $E_{HV}$. An increase in the anode voltage $E_{HV}$ means an increase in the pulse voltage generated across the first part 42 and the second part 43 of the secondary winding, as a result of which the focus voltage $E_F$ is required to be increased by about 2% of the increment of the anode voltage with the increase thereof. The voltage $E_C$ charged to the focus capacitor 47, however, remains at the previous level and is therefore lower than the pulse voltage. The result is that current $i_3$ flows in the focus capacitor 47 until the charges in the focus capacitor becomes equivalent to the pulse voltage, so that the voltage thus finally coincided with each other is smoothed and applied from the terminal 49 to the focus electrode.

Figure 7:
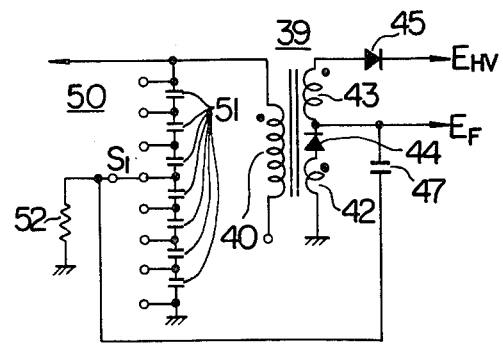
FIGS. 7, 8, 9, 10, 11, and 12, are circuit configuration diagrams showing other embodiments of the high voltage generating apparatus according to the present invention.

Still another embodiment of the invention is shown in FIG. 7. In this embodiment, focus adjustment is performed by a capacitor voltage-dividing circuit 50 doubling as a resonant capacitor including a plurality of capacitors 51 with a low breakdown voltage in series. This is obtained by subdividing and thus effectively using the conventional resonant capacitor 51 including a plurality of series capacitors with low breakdown voltage. A safety resistor 52 is inserted between the low voltage side of the focus capacitor 51 and the earth for preventing generation of a high potential at the tip with the opening of the focus regulating tap $S_1$. A low-cost small resistor with high resistance value and low breakdown voltage is used for the purpose of acting as the safety resistor 52.

Figure 8:
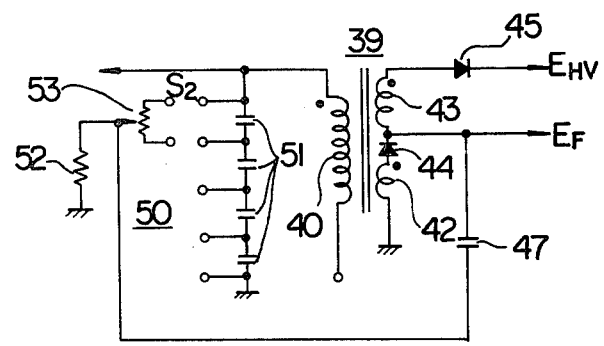

A further embodiment of the invention is shown in FIG. 8. In this embodiment, the number of the voltage-dividing taps $S_2$ of the capacitor voltage-dividing circuit 50 explained with reference to FIG. 7 is reduced to perform fine adjustment by the variable resistor 53. In this case, the conventional resonant capacitor including a plurality of capacitors connected in series may be used without any change, and also the applied voltage is small as compared with the case of FIG. 6, thus permitting the use of a compact, low-cost small variable resistor.

The foregoing description refers to the circuit in which the focus regulating flyback pulse voltage is produced by dividing the voltage between the high voltage side of the primary winding of the flyback transformer and the earth. It is however obvious that, in the presence of a potential difference, the regulating flyback pulse voltage may be taken out at any point, as illustrated by other embodiments shown in FIGS. 9, 10 and 11.

Figure 9:
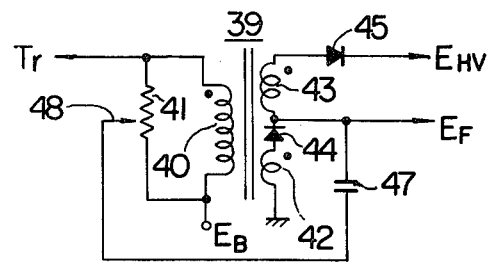
Figure 10:
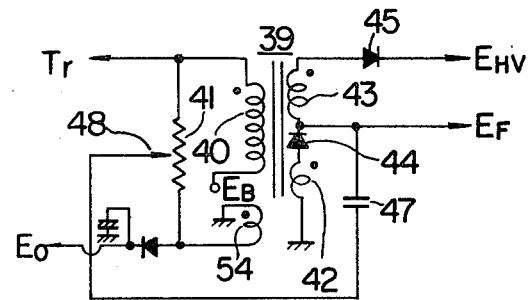
Figure 11:
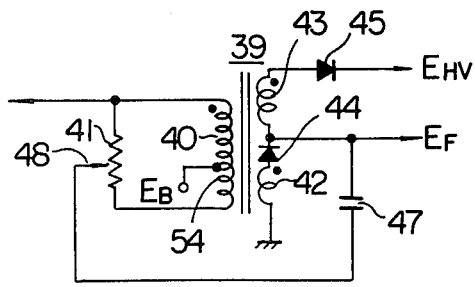

The embodiment of FIG. 9 is such that a variable resistor 41 is connected in parallel across the primary winding 40, while the embodiment of FIG. 10 is associated with the enlarged range of voltage regulation, if it is insufficient, and effectively utilizes a tertiary voltage winding 54 separately provided. The circuit of FIG. 11 similarly relates to an enlarged regulation range with a winding 54 additionally wound on the low voltage side of the primary winding 40 for enlargement of voltage regulation range.

Figure 12:
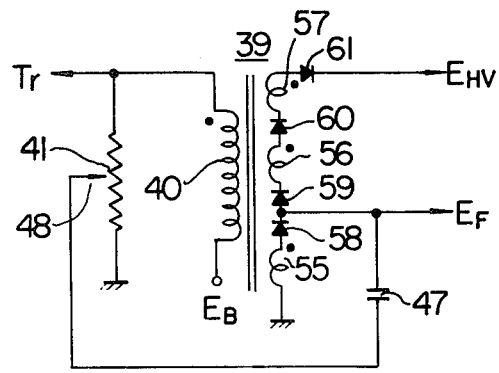

With reference to FIG. 12, still another embodiment of the invention widely used recently is illustrated in which the secondary winding is divided into three parts 55, 56 and 57 to facilitate high harmonics resonance such as of 5th or 9th power. In order to reduce the earth distributed capacity of the second part 56 of the secondary winding, the second and third parts thereof are connected to the cathode of the focus winding diode 58 through the diode 59 of all the diodes 58, 59, 60 and 61.

It will be understood from the foregoing description that the present invention eliminates the high voltage resistor connected to the anode voltage and focus voltage sections in the conventional circuits, and therefore a high insulation, high cost and bulkiness resulting from the use of a high voltage resistor are all obviated on the one hand while at the same time greatly reducing power consumption on the other. Further, the focus regulating transformer of the conventional circuit of FIG. 1 which is complicated in operation, high in cost and bulky, is replaced by a compact variable resistor or capacitor, thus leading to various advantages of the invention including compactness, light weight, low cost and operating ease.

We claim:
1. A high voltage generating apparatus comprising:
   a horizontal output circuit for generating flyback pulse during a blanking period of horizontal scanning;
   a flyback transformer including a primary winding and a first and a second secondary windings for boosting said flyback pulse;
   a plurality of diodes, at least one of said diodes being connected with said first secondary winding to form a lower voltage series circuit and at least one other of said diodes being connected with said second secondary winding to form a higher voltage series circuit which is connected with said lower voltage series circuit with an intermediate point therebetween;
   means for supplying the high D.C. voltage required for a picture tube across said lower and higher voltage series circuits;
   a variable voltage-dividing circuit connected with the primary winding of said flyback transformer;
   a focus capacitor one terminal of which is connected to said intermediate point of said series circuits, the other terminal of said focus capacitor being connected to said variable voltage-dividing circuit; and
   means for supplying the variable focus D.C. voltage at said intermediate point to a picture tube as a focus control voltage therefor.
2. A high voltage generating apparatus according to claim 1, in which said variable voltage dividing circuit comprises a variable resistor.
3. A high voltage generating apparatus according to claim 1, in which said variable dividing circuit comprises at least a capacitor.
4. A high voltage generating apparatus according to claim 1, in which said variable voltage-dividing circuit comprises a combination of a variable resistor and at least a capacitor.
5. A high voltage generating apparatus according to claim 1, further comprising means for applying positive and negative pulse voltages to said variable voltage-dividing circuit thereby to enlarge the range of voltage regulation.
6. A high voltage generating apparatus comprising a flyback transformer including a primary winding and a secondary winding divided into a first part and a second part, a first diode inserted between the high voltage side of said first part and the low voltage side of said second part, said first diode having the anode thereof connected to said high voltage side of said first part and the cathode thereof connected to said low voltage side of said second part, a second diode connected between the high voltage side of said second part of said secondary winding and a picture tube in the same direction as said first diode, said first diode having the cathode thereof connected to the focus electrode of said picture tube, a focus capacitor having a terminal thereof connected to the cathode of said first diode, a variable voltage-dividing circuit connected to the primary side of said flyback transformer and also to the other terminal of said focus capacitor, a variable focus D.C. voltage being generated at a junction point of said first diode and said focus capacitor.
7. In a high voltage generating apparatus comprising:
   a flyback transformer including a primary winding and first and second secondary windings;
   a first diode connected at one end thereof in series with one terminal of said first secondary winding so as to form a first series circuit with two terminals one of which is the other one end of said first diode, and the other one of which is the other one terminal of said first secondary winding;
   a second diode connected at one end thereof in series with one terminal of said second secondary winding so as to form a second series circuit with two terminals one of which is the other one end of said second diode, and the other one of which is the other one terminal of said secondary winding;
   a D.C. voltage derivation circuit having a D.C. voltage derivation terminal and including means for connecting said derivation terminal to the one of the two terminals of said first series circuit which is at the higher potential, and for connecting the other one terminal of said second series circuit with said D.C. voltage derivation terminal, so that a D.C. high voltage required for a picture tube is obtained at the D.C. voltage derivation terminal,
   the improvement comprising:
   a variable voltage-dividing circuit connected with said primary winding of said flyback transformer so as to be supplied with a driving pulse which drives the flyback transformer to generate a flyback pulse in the secondary windings:
   a focus capacitor connected at one terminal thereof with said D.C. voltage derivation terminal and at the other one terminal thereof with said variable voltage-dividing circuit, so that the output pulse of the variable voltage-dividing circuit is superposed with the D.C. voltage at the D.C. voltage derivation terminal to form a variable focus D.C. voltage; and
   means for supplying the variable focus D.C. voltage to a picture tube as a focus control voltage therefor.

* * * * *